W. H. LANDERS.
APPARATUS FOR RECOVERING QUICKSILVER FROM ITS ORE.
APPLICATION FILED MAR. 29, 1916.
1,195,236.
Patented Aug. 22, 1916.
2 SHEETS—SHEET 1.
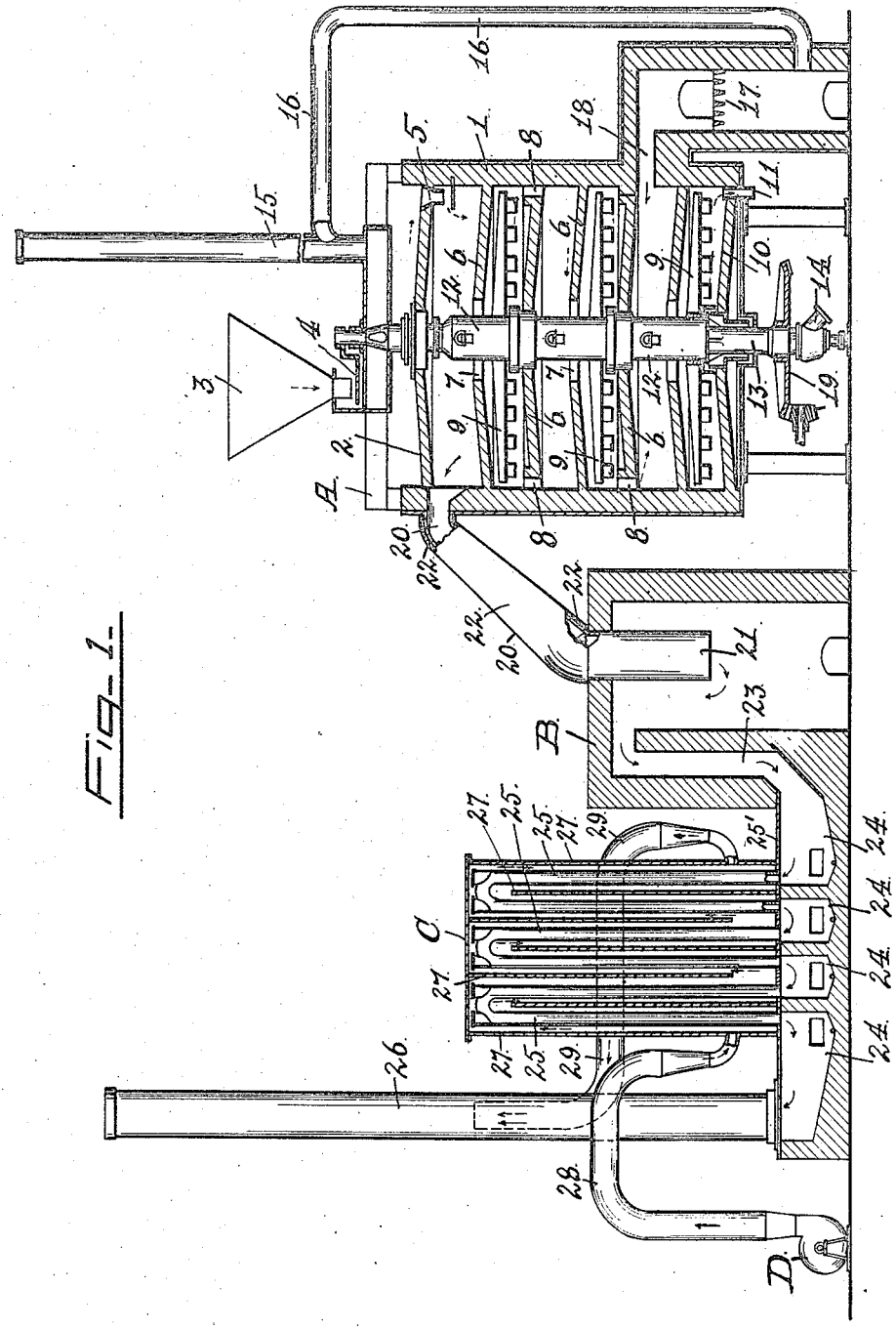
WITNESS
Wm F. Drew
INVENTOR.
William H. Landers
BY
Wm F. Booth
ATTORNEY

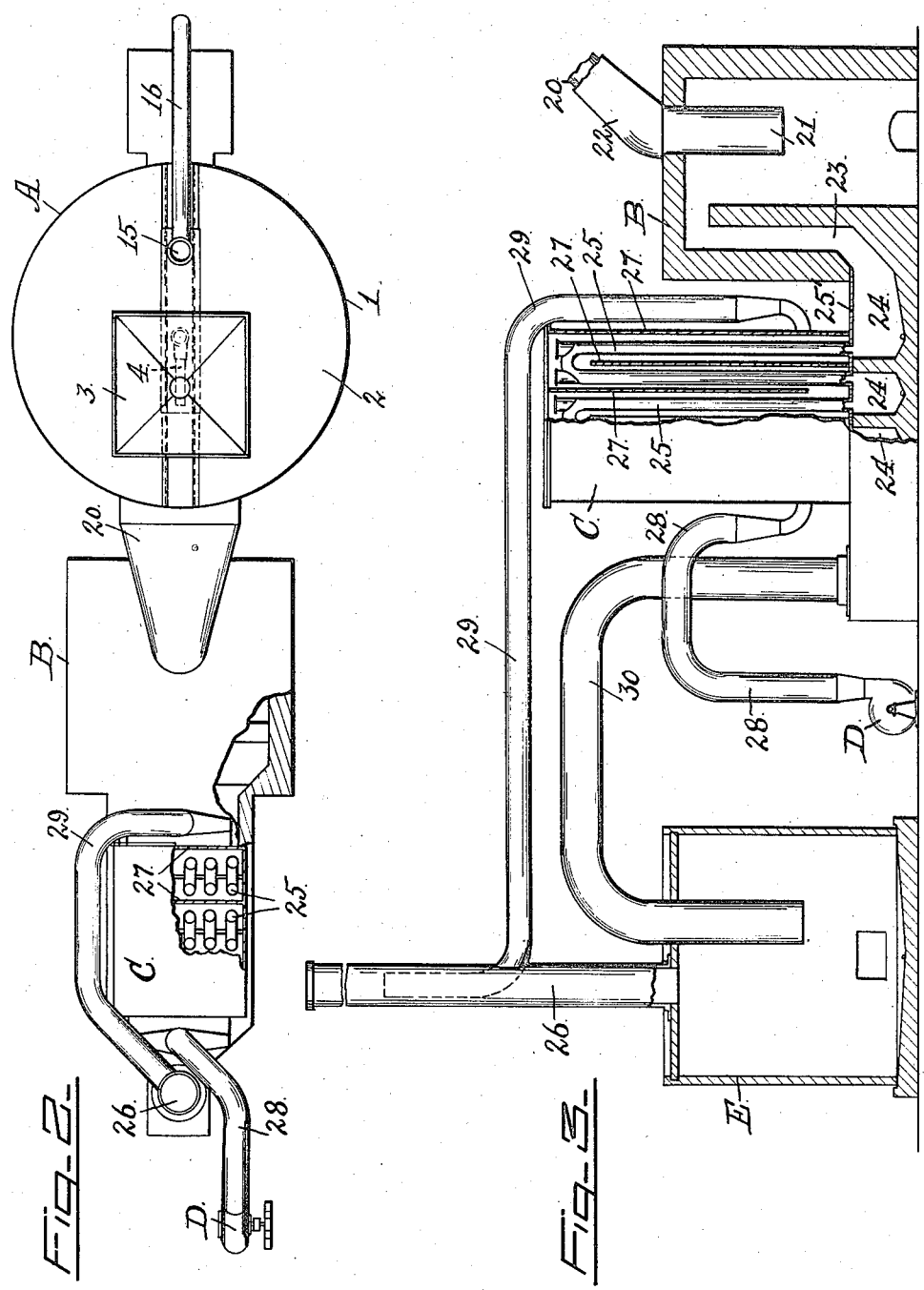

UNITED STATES PATENT OFFICE.

WILLIAM H. LANDERS, OF NEW ALMADEN, CALIFORNIA, ASSIGNOR OF ONE-HALF TO PACIFIC FOUNDRY COMPANY, OF SAN FRANCISCO, CALIFORNIA, A CORPORATION OF CALIFORNIA.

APPARATUS FOR RECOVERING QUICKSILVER FROM ITS ORE.

1,195,236. Specification of Letters Patent. Patented Aug. 22, 1916.

Application filed March 29, 1916. Serial No. 87,618.

*To all whom it may concern:*

Be it known that I, WILLIAM H. LANDERS, a citizen of the United States, residing at New Almaden, in the county of Santa Clara and State of California, have invented certain new and useful Improvements in Apparatus for Recovering Quicksilver from Its Ore, of which the following is a specification.

My invention relates to the recovery of quicksilver from its ore, and particularly to a novel apparatus therefor, comprising, in general terms, a suitable roasting furnace, preferably of the multiple-hearth type, in which the quicksilver vapor is distilled off; a dust-settler of a form and at a temperature adapted to separate the dust from the vapors and gases without precipitating the quicksilver; a condenser to separate the quicksilver from the vapors and gases; and a means, in connection with the condenser, serving the double function of a cooling medium therefor, and a draft increaser through the apparatus. With these elements may be incorporated, if found desirable, a final settler in which any particles of quicksilver which may tend still to remain with the gases after passing through the condenser, may be separated and recovered.

My apparatus and the manner of its use will be fully understood from the following description taken in connection with the accompanying drawings, in which—

Figure 1 is a vertical sectional elevation of my apparatus. Fig. 2 is a plan of the same. Fig. 3 is a fragmentary view showing the incorporation of a final settler.

A indicates, in general, the furnace; B, the dust settler; C, the condenser, D, the fan which furnishes the cooling medium for the condenser, which medium is also used as a draft increaser; and E, in Fig. 3, indicates a final settler.

The furnace A may, broadly considered, be any suitable type adapted for the distillation of quicksilver from its ore. The best form of furnace is, however, that type known as a multiple-hearth furnace, and is so herein illustrated. It needs only general description, as it is in itself a well known type. It comprises a shell 1, a top 2, to which from the hopper 3, the ore is supplied by a rotating scraper 4, said ore passing from the top through a delivery 5, to the uppermost of a vertical series of hearths 6, with alternate central openings 7 and peripheral openings 8, and being stirred and advanced from hearth to hearth by the revolving rabble-arms 9 until it is delivered from the lowermost or cooling hearth 10 through the discharge 11.

12 and 13 are the members of a hollow rotating shaft which carries the rabble-arms 9 which are hollow.

Circulating air which is admitted at 14 passes through and cools the shaft and arms and is discharged into the stack 15, from which it may be diverted through the return pipe 16 in a heated condition to the furnace grate 17 for the combustion of fuel and oxidation of the ore, said furnace grate communicating through the flue 18 with the lower roasting hearth of the furnace, said air with the products of combustion passing through flue 18 into the furnace A and over the hearths 6 in a direction opposite to the flow of ore, to the vapor and gas outlet 20. 19 are the driving gears for the shaft. This furnace is peculiarly adapted for the distillation of the quicksilver vapors, in that the ore is subjected to a most efficient heat under favorable conditions of exposure of the entire mass and duration of time, throughout a relatively long course, so that a most complete distillation is effected.

The vapor and gas outlet from the furnace A is the flue 20. This leads down into the dust settler B through its top, as shown at 21 and terminates above the floor of said settler.

The settler B is made of brick or concrete or any material which will sufficiently conserve the heat; and for a like purpose the vapor and gas outlet flue 20 from the furnace is best covered with heat insulating material, as shown at 22. The design of this dust settler has a double object, namely, to keep the vapors and gases sufficiently hot to prevent any precipitation or condensation of the quicksilver in the settler, and by its large dimensions relatively to the inlet 21, to reduce the velocity of the vapors and gases therein, thereby allowing the dust to separate out and settle more effectually. The entering vapors and gases are cushioned as it were against the volume of quiet gas in the bottom of the settler, and with slower velocity rise in the larger area above, and pass out, practically free from dust, through the outlet passage 23 which leads from the upper portion of the settler down to the condenser C.

The condenser C comprises a number of collecting chambers or trays 24, in a base 25', and successively connected by a plurality of stand pipes 25, the last chamber communicating with the stack 26. Between and around the stand pipes 25 are the baffles 27 which form the space for the circulating cooling medium. This medium, in the present case, is air supplied by the fan D. This fan connects by a pipe 28 with the baffle space, and said space communicates at the outlet end of its complete path of circulation with a pipe 29, which is carried to and enters the stack 26. The air thus serves the double purpose of a cooling medium for the condenser; and in its heated condition, due to the interchange of heat in the performance of its first function, it serves the further purpose of increasing the draft, which creates a suction on the entire system, inducing a current of vapors and gases from the furnace, thus effectually taking them away from the roasting ore.

In some cases, it may be desirable to effect a final condensation of the quicksilver from the gases after they have passed through the condenser. This is shown in Fig. 3, wherein the outlet from the final collecting tray of the condenser, instead of communicating directly with the stack, communicates through a pipe 30 with the final settler E. This settler is, in general, similar to the dust settler B, but with no design of keeping it warm; rather, it is a cooling settler. In this case the stack 26 leads from the final settler E, and the air pipe 29 from the condenser leads, as before, into the stack. The gases having been freed by condensation of as much of the quicksilver as the condenser C is capable of precipitating, are passed through pipe 30 into the final settler E. Herein, encountering coolness and quietness, some remaining quicksilver may settle out and be recovered.

The general operation or use of the apparatus may now be briefly described. The ore in crushed condition, say from ¾ inch mesh down, is roasted in the multiple-hearth furnace A. The gases therein driven off, together with dust from the furnace pass over into the dust settler B. In this settler the gases will remain hot enough to prevent the precipitation or condensation of any quicksilver therein, and said settler has a form and is of such dimensions as to reduce the velocity of the gases and thereby provide a quietness conducive to the settling out of the dust. The gases which now contain only a small amount of dust, if any, then pass into and through the condenser C, and the quicksilver settles in the collecting boxes or trays of the condenser. The condensation is due to the current of air from the fan D, passing through the baffle spaces of the condenser. The air quickly cools the pipes, and when it is liberated, it is in a heated condition and is discharged into the stack, thereby increasing the draft and creating effective suction throughout the whole apparatus.

I claim:—

1. An apparatus of the character described, comprising a roasting furnace; a dust-settler with which the gas outlet from said furnace communicates; a condenser with which the dust-settler communicates; a stack to which the uncondensed gases from the condenser are delivered; means for subjecting the condenser to a cooling medium; and means for conducting the said medium with its absorbed heat, after it leaves the condenser, into the stack, to increase the draft through the apparatus.

2. An apparatus of the character described, comprising a roasting furnace; a dust-settler communicating with and adapted to receive the heated gases from said furnace; means for conserving the heat of the gases within the settler to prevent condensation therein; a condenser with which the dust-settler communicates; and a stack to which the uncondensed gases from the condenser are delivered.

3. An apparatus of the character described, comprising a roasting furnace; a dust-settler communicating with and adapted to receive the heated gases from said furnace; means for conserving the heat of the gases within the settler to prevent condensation therein; a condenser with which the dust-settler communicates; a stack to which the uncondensed gases from the condenser are delivered; means for subjecting the condenser to a cooling medium; and means for conducting the said medium with its absorbed heat, after it leaves the condenser, into the stack, to increase the draft through the apparatus.

4. An apparatus of the character described, comprising a roasting furnace having a gas outlet; a dust-settler into which the gas outlet of the roasting furnace leads downward, said settler having dimensions relatively to said gas outlet adapting it to reduce the velocity of the gases passing through it and said settler having an outlet passage leading from its upper portion; means for conserving the heat of the gases within the settler to prevent condensation therein; a condenser with which the dust-settler outlet passage communicates; and a stack to which the uncondensed gases from the condenser are delivered.

5. An apparatus of the character described, comprising a roasting furnace having a gas outlet; a dust-settler into which the gas outlet of the roasting furnace leads downward, said settler having dimensions relatively to said gas outlet adapting it to reduce the velocity of the gases passing through it and said settler having an outlet passage leading from its upper portion; means for conserving the heat of the gases within the settler to prevent condensation therein; a condenser with which the dust-settler outlet passage communicates; a stack to which the uncondensed gases from the condenser are delivered; means for subjecting the condenser to a cooling medium; and means for conducting the said medium with its absorbed heat, after it leaves the condenser, into the stack, to increase the draft through the apparatus.

6. An apparatus of the character described, comprising a roasting furnace; a dust-settler with which the gas outlet from said furnace communicates; a condenser with which the dust-settler communicates; a second settler to which the condenser delivers the uncondensed gases and in which any remaining condensate is separated; a stack with which the second settler communicates; means for subjecting the condenser to a cooling medium; and means for conducting the said medium with its absorbed heat, after it leaves the condenser, into the stack to increase the draft through the apparatus.

7. An apparatus of the character described, comprising a roasting furnace having a gas outlet; a dust-settler into which said roasting furnace gas outlet leads downward, said settler having dimensions relatively to said gas outlet adapting it to reduce the velocity of the furnace gases passing through it and said settler having an outlet passage leading from its upper portion; means for conserving the heat of the gases within the settler to prevent condensation therein; a condenser with which the dust-settler outlet passage communicates; a second settler communicating with the condenser and having dimensions relatively to the condenser communication adapting it to reduce the velocity of the uncondensed gases received from the condenser and to separate the remaining condensate from said gases; a stack with which the second settler communicates; means for subjecting the condenser to a cooling medium; and means for conducting the said medium with its absorbed heat, after it leaves the condenser, into the stack to increase the draft through the apparatus.

In testimony whereof I have signed my name to this specification in the presence of two subscribing witnesses.

WILLIAM H. LANDERS.

Witnesses:
GRACE LANDERS,
ALICE PUTNAM.